United States Patent [19]

Russell et al.

[11] Patent Number: 5,085,326
[45] Date of Patent: Feb. 4, 1992

[54] LOAD LOCK HOLDER

[75] Inventors: Michael T. Russell, Kirkland; A. Bruce Bliven, Renton, both of Wash.

[73] Assignee: Paccar Inc., Bellevue, Wash.

[21] Appl. No.: 541,267

[22] Filed: Jun. 20, 1990

[51] Int. Cl.$^5$ ............................................. E05B 73/00
[52] U.S. Cl. ........................................ 211/4; 211/60.1
[58] Field of Search .................. 211/4, 8, 60.1, 64, 211/70.5, 70.6

[56] References Cited

U.S. PATENT DOCUMENTS

| | | |
|---|---|---|
| 2,002,566 | 5/1935 | Conigrave . |
| 2,097,939 | 11/1937 | Timm . |
| 2,303,014 | 11/1942 | Williams . |
| 2,552,293 | 5/1951 | Page et al. . |
| 2,581,246 | 1/1952 | Fenton ............................. 211/60.1 X |
| 2,581,824 | 1/1952 | Windahl . |
| 2,788,928 | 4/1957 | Des Fosses . |
| 3,848,785 | 11/1974 | Bott . |
| 3,876,076 | 4/1975 | Hazelhurst ...................... 211/70.8 X |
| 4,063,646 | 12/1977 | Stahl, Jr. ....................... 211/70.8 X |
| 4,071,176 | 1/1978 | Tuzee ............................. 211/70.5 X |
| 4,084,735 | 4/1978 | Kappas ............................... 224/42.1 |
| 4,869,377 | 9/1989 | Mercado ........................... 211/60.1 X |

OTHER PUBLICATIONS

Brochure entitled "J-LOCK-Load Lock Storage & Security" by Jones Manufacturing Company (date unknown).
Photographs (2) of load lock holder manufactured by Protech of Vancouver, Washington, approximately Dec. 1989.
Brochure entitled "BARSTOW © Load Lock Security Clamp" by Jenco (date unknown).
"ITC Conference President Don Freymiller Speaks Out on Drive Pay, Rates, Taxes," *Refrigerated Transporter*, pp. 18-22, May 1990.

Primary Examiner—Blair M. Johnson
Assistant Examiner—Korie Chan
Attorney, Agent, or Firm—Seed and Berry

[57] ABSTRACT

A load lock holder comprises a base plate for mounting the load lock holder to a wall of the tractor or trailer and multiple clips made of a resilient material mounted to the base plate, each retaining clip defining a clamping area for holding the load lock and a slot located on one side of the retaining clip through which a load lock may be forced before the load lock enters the clamping area of the clip. Additionally, a retaining gate may be used to provide an additional securing force to the load locks in the load lock holder. A cushion may be coupled to the retaining gate for positively engaging the load locks to prevent the load locks from moving relative to the load lock holder.

17 Claims, 2 Drawing Sheets

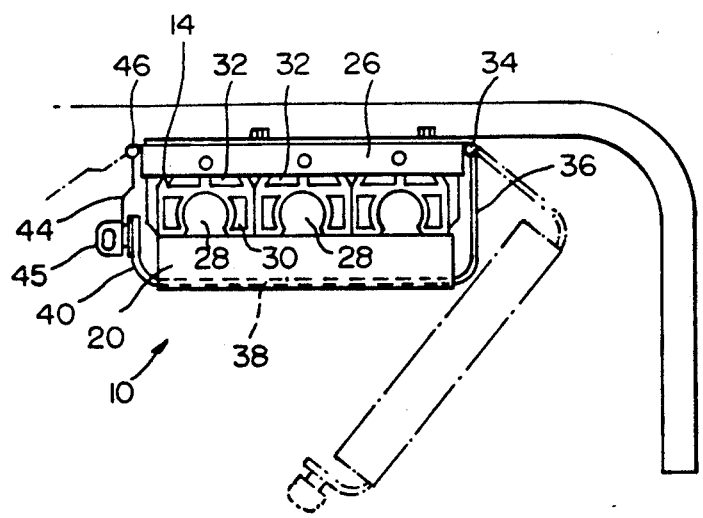

LOAD LOCK HOLDER

DESCRIPTION

1. Technical Field

The present invention relates to devices for holding objects, and more specifically, to devices for holding load locks used in the trucking industry.

2. Background of the Invention

In the trucking industry, in particular when tractor-trailer trucks are used, the need for stabilizing partial loads hauled in a trailer has long been recognized. Tractor-trailer trucks generally require large trailers to haul enough material to make the trips profitable. Ideally, the trailer is loaded so that the contents occupy the entire volume of the trailer. Under such conditions, the load cannot shift and is completely stable during transit.

Many times, however, the trailer carries only a partial load, either because the trailer has been partially loaded to begin with or because some of the contents have been removed from the trailer before the truck reaches its final unloading destination. Without more, the partial loads tend to shift and slide around inside the truck during transit, which may damage the trailer contents and the trailer itself. To prevent the partial loads from shifting, a means for securing the partial loads must be used to stabilize the load.

Load locks are commonly used inside a trailer to keep a partial load from shifting. In general, a load lock is a type of cargo restraint device that has a telescoping body that is placed against a partial load and extended between opposite walls of the trailer to prevent the partial load from shifting. Often, a plurality of load locks are used to secure a partial load. Load locks are commonly tubular shaped, although it is understood that load locks having a square, triangular, or other cross sectional shapes may also be used.

A significant storage problem arises when load locks are not being used. It is essential that the load locks be readily accessible to the truck driver in case the need arises to transport a partial load. Thus, the load locks must be stored somewhere on the truck when not in use.

In the case of an empty trailer, the load locks may simply be placed on the bed of the trailer. This storage method has proven to be inadequate, however, because the load locks tend to slide around on the trailer floor, which may result in damage to both the load locks and the interior of the trailer. In addition, the tractor is often driven independently of any trailer, in which case it is preferable to store the load locks on the tractor portion of the truck. Furthermore, when the trailer is completely full of contents, the option of storing the load locks on the trailer floor is generally not available. Therefore, it is preferable that the load locks be stored somewhere other than inside of the trailer.

A common alternative method for storing load locks while not in use is to install the load locks horizontally between the side extenders of the cab, similar to the way they are used to secure a partial load. The load locks are telescopically extended between the cab extenders and a positive displacement mechanism maintains the load locks in the extended position. This, however, frequently causes damage to the side extenders. In addition, load locks have been known to fall from between the extenders onto the highway which creates a dangerous driving situation and results, of course, in a lost load lock.

Another alternative for storing load locks when not in use is to place them on a storage rack. An example of a load lock storage rack is shown in U.S. Pat. No. 4,869,377. There are several disadvantages, however, to a load lock holder of this type: it requires multiple pivoting mechanical latches to hold the load locks in place; it is capable of handling only one diameter of load locks per each specific design of that holder; it has multiple moving parts, which increases the risk of malfunction; and it is complex and thus expensive to manufacture.

Accordingly, there is a need to develop a device for holding load locks when the load locks are not being used that requires no pivoting mechanical latches to hold the load locks, is capable of holding load locks of various diameters and cross sectional shapes per each specific holder design, involves few moving parts, and is inexpensive to manufacture.

SUMMARY OF THE INVENTION

It is a primary object of the present invention to provide a load lock holder for storing load locks when not in use that requires no pivoting mechanical latches to hold the load locks in place.

Another object of the invention is to provide a load lock holder capable of holding a variety of load locks of varying diameters and cross sectional shapes.

Another object of the invention is to provide a load lock holder which can be mounted on any wall of the cab or trailer of a tractor-trailer truck.

Yet another object of the invention is to provide a load lock holder which can be mounted to hold the load locks in a vertical, horizontal, or any other orientation.

Still another object of the invention is to provide a load lock holder for the safe storing of load locks when not in use.

Another object of the invention is to provide a load lock holder with a retaining gate for positively engaging the load locks to further secure the load locks within the load lock holder.

Another object of the invention is to free the operator's hands when installing multiple load locks.

Yet another object of the invention is to provide an anti-rattling device for preventing the load lock holder from rattling when no load locks are being stored.

The foregoing objects are achieved by the present load lock holder invention, which comprises a base plate for mounting the load lock holder to a wall of a tractor-trailer truck. Multiple clips made of a resilient material are mounted to the base plate. Each clip defines a clamping area for holding the load lock and a slot located on one side of the clip through which a load lock is forced when placing the load locks in the load lock holder. Additionally, a retaining gate may be used to provide an additional securing force to the load locks in the load lock holder. A cushion may be coupled to the retaining gate for positively engaging the load locks to prevent the load locks from moving relative to the load lock holder.

BRIEF DESCRIPTION OF THE DRAWINGS

FIG. 2 is a top plan view of the load lock holder;
and
FIG. 3 is a side elevational view of the load lock holder.

DETAILED DESCRIPTION OF THE INVENTION

Figure 1:
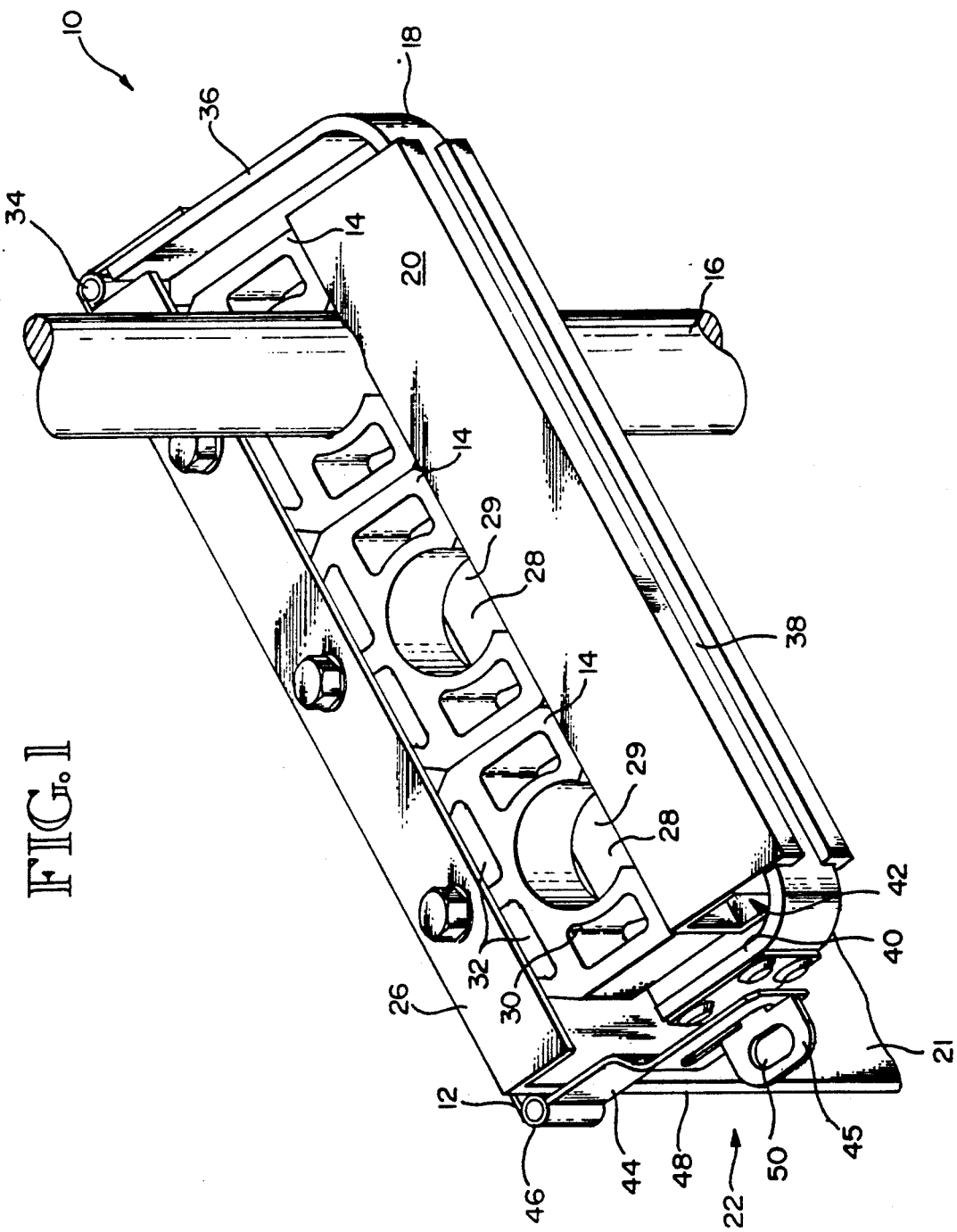
FIG. 1 is a perspective view of the load lock holder.

The present invention involves a load lock holder 10 which comprises a main support bracket 12 for mounting the load lock holder onto a wall associated with a hauling vehicle, such as a tractor-trailer truck. A plurality of clips 14 are mounted to the main support bracket, each clip defining a clamping area 28 for holding a load lock 16. Additionally, a retaining gate 18 may be hingedly coupled to the main support bracket to further secure the load lock in place. A cushion 20 may be mounted to the retaining gate for directly engaging the load lock to prevent the load lock from moving relative to the load lock holder. A latch 22 may be used in connection with the retaining gate to secure the gate in a closed position and provide a means for attaching a padlock.

As shown in FIG. 1, one embodiment of the main support bracket 12 includes a base 24 and a mounting member 26 extending perpendicularly from the base. The load lock holder 10 is mounted to a wall of the tractor or trailer through the base. The mounting member provides a means for coupling the retaining clips 14 to the load lock holder. The retaining clips may be coupled to the main support bracket by mechanical means, by adhesives, or any other suitable means. It is to be understood, however, that other mounting arrangements and configurations for the main support bracket could be used with the invention. The main support bracket may be made of metal, plastic, or any other material capable of supporting the load lock holder. Preferably, the main support bracket is an extruded aluminum angle.

Retaining clips 14 are mounted to the main support bracket and are the primary means for holding the load locks 16 in place. To be sure, the clips are capable of holding the load locks in place on the load lock holder 10 during shipping without more. The clips define a clamping area which, in one embodiment, is cylindrically shaped to accommodate a corresponding cylindrically or other shaped load lock. It is understood that the clips may be manufactured to define, however, a clamping area of varying cross sectional shapes to correspond with the shape of any particular load lock.

Each clip 14 is preferably made of an extruded rubber, such as the material currently marketed under the SANTOPRENE TM trademark, so that the clamping area 28 can stretch around and hold the load lock 16 in place. Other resilient materials, such as spring steel, could also be used to make the clip. The clip shown in Figure is capable of deforming to hold a cylindrically shaped load lock or a square shaped load lock. The clamping area is preferably undersized as compared to the outside of the load lock to provide an interference fit between the load lock and the clamping area of the clip once the load lock has been inserted into the clamping area. This interference fit prevents the load locks from falling out of the load lock holder after they have been inserted. In addition, the interference fit allows a load lock to be placed on the holder by deformation of the clip alone, without the need of an additional mechanical pivoting latch.

In addition to the clamping area 28, each retaining clip 14 also defines a slot 29 through which the load lock 16 is normally inserted. The slots are generally smaller than the size of the clamping area so that the load locks must be forced or snapped into the clamping area. The retaining ability of the clips is sometimes referred to as a "clip action." The clip action allows quick, safe installation of the load locks onto the load lock holder 10.

The clips 14 also define apertures 30, 32 located adjacent and around the clamping area 28. The purpose of the apertures is to allow the clamping area to expand to accommodate a variety of diameters and sizes of load locks. The apertures 30, 32 also aid in the mechanics of the so-called "clip action." As shown in FIG. 1, the apertures 30 are located opposite each other to allow the clamping area to expand in a direction transverse to the slot 29. The apertures 32 are located side-by-side, opposite the slot 29 to allow the clamping area to expand in a direction away from the slot 29. The slot 29 itself also allows the clip to expand to accommodate a larger size of load locks.

An additional, alternative feature to the present invention is a retaining gate 18, which may be coupled to the main support bracket 12 by way of a hinge 34. It is to be understood that other ways of mounting the retaining gate to the main support bracket could be used. The retaining gate has a first section 36 coupled directly to the hinge 34, and a second section 38 extending perpendicularly from the first section, the second section extending parallel to the plane of the base 24 of the main support bracket 12. A third section 40 of the retaining gate extends perpendicularly of the second section and is parallel to the first section.

A cushion 20 may be mounted to the second section 38 of the retaining gate 18 for engaging the load locks 16. The cushion is preferably made of an extruded rubber, such as the material that is currently marketed under the SANTOPRENE TM trademark. It is understood, however, that other resilient materials could be used for the cushion. The cushion defines a hollow, rectangular-shaped opening 42 which enables the cushion to deform once it engages a portion of the load lock 16 to overcome the interference between the cushion and the load lock. A primary purpose for the retaining gate and corresponding cushion is to prevent the load lock from vibrating during transit. In addition, the retaining gate and corresponding cushion act as an anti-rattling device for the load lock holder when load locks are not being stored.

The means for securing the retaining gate 18 into engagement with the load locks 16 may be by any means generally known in the art. In the embodiment shown in FIGS. 1-3, a latch 22 is coupled to the third section 40 of the retaining gate 18 to secure the retaining gate 18 in place, with the cushion 20 engaging the load lock 16. The embodiment of FIGS. 1-3 shows the latch as being a hasp 44 with a corresponding swivel staple 45 which can be rotated into alignment with a slot 48 in the hasp. The hasp 44 is mounted to the main support bracket 12 by way of hinge 46. The swivel staple may be aligned with and inserted into the slot 48 to secure the retaining gate so that the cushion is constantly engaging the load locks. The swivel staple defines a aperture 50 through which a padlock or other locking device may be inserted to prevent theft of the load locks. The aperture 50 is large enough so that it may accept a wide variety of padlocks.

In the preferred operation, the retaining gate 18 is opened (shown in phantom in FIG. 2) and a load lock 16 is forced through the slot 29 into the clamping area 28 of the clip 14. The clip action of the clip holds the load lock in place. The retaining gate is pivoted about hinge 34 until the cushion 20 engages a portion of the load lock which extends through slot 29. As shown in FIG. 1, the retaining gate is then forced to overcome the interference between the load lock and the cushion until the swivel staple 45 is aligned with and inserted into the slot 48 of the hasp 44.

Referring now to FIG. 3, a load lock 16 is preferably held by a pair of load lock holders 10a, 10b to stabilize both ends of the load lock. FIG. 3 shows an arrangement of the load lock holders 10a, 10b to hold the load lock in a vertical orientation. It is understood, however, that the load lock holders 10a, 10b may alternatively be arranged to hold the load lock in a horizontal or inclined orientation.

When a vertical mounting arrangement is utilized, the lower load lock holder 10b may further include a support shelf 56 coupled to the main support bracket 24 to support the weight of the load lock 16. In a horizontal mounting arrangement, the weight of the load lock is supported by the clips 14. It is possible to mount the load lock holders 10a, 10b in a horizontal position regardless of whether the slots 29 to face upward, downward, or to the side. Unlike some types of rod holders, therefore, the present invention does not rely on gravity to hold the load locks in the clamping area 28 of the clips 14. It is generally preferable to mount the load lock holders 10a, 10b in a vertical orientation on the back wall of the cab of a tractor-trailer truck so that the load locks remain with the driver when not in use.

While the preferred embodiments of the present invention have been illustrated and described, it is to be understood that variations will be apparent to one of ordinary skill in the art without departing from the principles described herein. Accordingly, the invention is not to be limited to the specific embodiment illustrated in the drawings.

We claim:

1. A load lock holder, comprising:
   a main support bracket for mounting a load lock holder to a wall; and
   a plurality of clips coupled to the main support bracket, each clip having a clamping area with a middle width lock, the clip having a front, outermost surface and an entrance slot at said outermost surface at the front of the clamping area, the slot having an entrance width at the outermost surface of the clip the entrance width being less than the middle width of the clamping area so that the load lock must be forced through the slot before entering into the clamping area and the clip will hold the load lock in place regardless of the orientation of the load lock holder, the entrance slot at said outermost surface spaced outwardly perpendicularly from a rear inside surface of the clamping area at a distance less than the middle width of the clamping area so that the clamping area holds the load lock with no fore or aft gap between the load lock and the clip to prevent movement of the load lock relative to the clip.

2. A load lock holder according to claim 1 wherein the cross section of the clamping area is less than the cross section of the load lock to create an interference fit which holds the load lock inside the clamping area, the cross-sectional shape of the clamping area being substantially the same as the cross-sectional shape of the load lock such that the load lock fills the entire clamping area to prevent movement of the load lock relative to the clip.

3. A load lock holder according to claim 1, further comprising:
   a retaining gate hingedly coupled to the main support bracket;
   a cushion bar coupled to the retaining gate for engaging a portion of the load lock extending through the slot to further secure the load lock inside the clamping area; and
   latching means for latching the cushion bar into constant engagement with the load lock to prevent the load lock from moving relative to the load lock holder.

4. A load lock holder according to claim 2, further comprising:
   a retaining gate hingedly coupled to the main support bracket;
   a cushion bar coupled to the retaining gate for engaging a portion of the load lock extending through the slot to further secure the load lock inside the clamping area; and
   latching means for latching the cushion bar into constant engagement with the load lock to prevent the load lock from moving relative to the load lock holder.

5. A load lock holder according to claim 1 wherein each clip comprising a plurality of apertures adjacent the clamping area, the apertures providing open areas into which the clip can expand to accommodate a variety of load lock sizes.

6. A load lock holder according to claim 3 wherein each clip comprising a plurality of apertures adjacent the clamping area, the apertures providing open areas into which the clip can expand to accommodate a variety of load lock sizes.

7. A load lock holder according to claim 4 wherein a first pair of apertures is located adjacent the clamping area on the opposite side of the slot and a second pair of apertures are located opposite each other at the sides of the clamping area transverse to the slot.

8. A load lock holder according to claim 3 wherein the load lock holder is mounted to the wall to hold the load lock in a vertical position.

9. A load lock holder according to claim 3 wherein the load lock holder is mounted to the wall to hold the load lock in a horizontal position.

10. A load lock holder according to claim 3 wherein the clamping area is capable of holding a cylindrically shaped load lock.

11. A load lock holder according to claim 3 wherein the clamping area is capable of holding a rectangular shaped load lock.

12. A load lock holder according to claim 2 wherein the latching means comprises a hasp and corresponding swivel staple.

13. A load lock holder according to claim 6, further comprising a support shelf coupled to the main support bracket for supporting the weight of the load lock.

14. A load lock holder, comprising:
   a main support bracket for mounting a load lock holder to a wall;
   a plurality of clips coupled to the main support bracket, each clip having a clamping area with a middle width for holding a load lock, the clip having a front, outermost surface and an entrance slot having a width at said outermost surface at the front of the clamping area, the width of the entrance slot at the outermost surface of the clip being less than the middle width of the clamping area so that the load lock must be forced through the slot before entering into the clamping area and the clip will hold the load lock in place regardless of the orientation of the load lock holder, the entrance slot at said outermost surface spaced outwardly perpendicularly from a rear inside surface of the clamping area at a distance less than the middle width of the clamping area so that the clamping area holds the load lock with no fore or aft gap between the load lock and the clip to prevent movement of the load lock relative to the clip;

a retaining gate hingedly coupled to the main support bracket;

a cushion bar coupled to the retaining gate for engaging a portion of the load lock which extends beyond said outermost surface to further secure the load lock within the load lock holder, the cushion bar deforming to overcome an interference between the load lock and the cushion; and latching means for latching the cushion into constant engagement with the load lock to prevent the load lock from moving relative to the load lock holder.

15. A load lock holder according to claim 12 wherein the load lock holder is secured to an area behind a cab of a tractor-trailer truck.

16. A load lock holder according to claim 5 wherein the entire clip is transversely resilient and expands in opposite directions to enlarge the clamping area and accommodate load lock of various diameters.

17. A load lock holder according to claim 4 wherein the retaining gate is closed when no load locks are being stored in the load lock holder and the cushion bar engages an outer area of the clips to prevent the load lock holder from rattling.

* * * * *

UNITED STATES PATENT AND TRADEMARK OFFICE
CERTIFICATE OF CORRECTION

PATENT NO. : 5,085,326

DATED : February 4, 1992

INVENTOR(S) : Michael T. Russell; A. Bruce Bliven

It is certified that error appears in the above-identified patent and that said Letters Patent is hereby corrected as shown below:

In column 5, claim 1, line 43, after "width" please insert -- for holding a load --.

In column 5, claim, 1, line 47, after "clip" please insert -- , --.

Signed and Sealed this

First Day of June, 1993

Attest:

MICHAEL K. KIRK

Attesting Officer

Acting Commissioner of Patents and Trademarks